United States Patent

Mizoguchi et al.

[11] Patent Number: 5,978,939
[45] Date of Patent: Nov. 2, 1999

[54] TIMEOUT MONITORING SYSTEM

[75] Inventors: Kenichi Mizoguchi; Kotaro Endo; Shigekazu Hirokane, all of Fuchu, Japan

[73] Assignee: Kabushiki Kaisha Toshiba, Kawasaki, Japan

[21] Appl. No.: 08/914,877

[22] Filed: Aug. 20, 1997

[30] Foreign Application Priority Data

Aug. 20, 1996 [JP] Japan ................................. 8-218684

[51] Int. Cl.$^6$ .................................................. G06F 11/00
[52] U.S. Cl. ............................................. 714/55; 713/502
[58] Field of Search ...................... 395/185.08, 183.19, 395/557; 714/55, 814, 815; 713/502, 601, 500

[56] References Cited

U.S. PATENT DOCUMENTS

| | | | |
|---|---|---|---|
| 5,012,435 | 4/1991 | Bailey et al. | 713/502 |
| 5,471,564 | 11/1995 | Dennis et al. | 709/102 |
| 5,649,098 | 7/1997 | Shieh et al. | 714/55 |
| 5,706,425 | 1/1998 | Unekawa | 714/55 |
| 5,734,641 | 3/1998 | Kawasaki et al. | 714/55 |

*Primary Examiner*—Joseph E. Palys
*Assistant Examiner*—Nguyen Xuan Nguyen
*Attorney, Agent, or Firm*—Oblon, Spivak, McClelland, Maier & Neustadt, P.C.

[57] ABSTRACT

A timeout monitoring system including plural timeout value setting mechanisms, each of which sets a timeout value as a result of the start-up. Also included is plural timeout monitoring mechanisms, each of which do not start the timeout value setting mechanism at the following stage but stop it, when the timeout value set by the timeout value setting mechanism at the preceding stage is not set again even after a specific time has elapsed. A watchdog timer outputs an abnormality notice, when the timeout value set by the timeout value setting mechanism at the last stage is not set again even after a specific time has elapsed. Hierarchizing the software of the watchdog timer makes it possible to set a suitable timeout value in the watchdog timer for a higher-speed sensing of timeout and monitor the timeouts of plural systems at plural levels, which improves the monitoring capability.

11 Claims, 3 Drawing Sheets

| CONDITION VARIABLE 1 | JUDGING CONDITION 1 | HANDLING PROCESS 1 |
|---|---|---|
| │ | │ | │ |
| │ | │ | │ |
| │ | │ | │ |
| CONDITION VARIABLE m | JUDGING CONDITION m | HANDLING PROCESS m |

$15_{n-1} \sim 15_0$

TIMEOUT MONITORING SYSTEM

BACKGROUND OF THE INVENTION

This invention relates to a timeout monitoring system used for sensing abnormalities in a computer system or a control system, and more particularly to a timeout monitoring system capable of monitoring and sensing a timeout at a plurality of levels by use of hierarchized software programs.

This application is based on Japanese Patent Application No. 8-218684, filed Aug. 20, 1996, the content of which is incorporated herein by reference.

In the field of sensing abnormality in the computer system or the like, a timeout monitoring system using a watchdog timer has been known.

FIG. 4 is a block diagram of the configuration of watchdog timer mechanism applied to a timeout monitoring system of this type. The watchdog timer mechanism comprises a timeout monitoring process 1 in the user layer, a watchdog timer 2 in the hardware layer, a process management subsystem in the OS layer, and an OS interval timer 4 in the hardware layer. The individual layers can operate at high speeds in this order: the hardware layer, OS layer, and user layer.

The timeout monitoring process 1 sets a timeout value in the watchdog timer 2 at regular intervals of time and thereafter requests the process management subsystem 3 to execute the process again after a specific period of time and then goes into the holding state.

The process management subsystem 3 manages a plurality of process schedule queues and treats the request for reexecution as one of the process schedule queues.

The watchdog timer 2 includes a setting register 2a, an operational comparator 2b, a timer 2c, and a timeout notifying section 2d. When a timeout value is set in the setting register 2a, the watchdog timer causes the operational comparator 2b to compare the timeout value with a reference value, while causing the timer 2c to count down the timeout value. When the result of the comparison has shown that the timeout has not been set again within a specific period of time, the timeout notifying section 2d outputs a timeout notice.

The OS interval timer 4 starts the process management subsystem 3 at regular intervals of several tens of milliseconds.

Each time being started by the OS interval timer 4, the process management subsystem 3 reschedules the timeout monitoring process 1 and each execution process (not shown) on the basis of the execution condition and priority for each process in each process schedule key. As a result, although the process management subsystem 3 is started every several tens of milliseconds, the interval of time at which the timeout monitoring process is started amounts to several hundreds of milliseconds.

Consequently, the timeout value the timeout monitoring process 1 sets in the watchdog timer 2 is of the order of several seconds.

With the timeout monitoring system, however, the time required for the timeout monitoring process 1 to be restarted is influenced by the schedule policy of the process management subsystem 2, which makes it impossible to set a timeout value smaller than a value of the order of several seconds in an ordinary OS, resulting in the problem of taking a longer time to sense abnormality.

The single watchdog timer 2 can monitor only one type of timeout and therefore cannot output a notice of more than one type of timeout, which leads to the problem of being unable to monitor more than one timeout or abnormality.

BRIEF SUMMARY OF THE INVENTION

Accordingly, an object of the present invention is to provide a timeout monitoring system capable of setting a suitable timeout value in a watchdog timer and monitoring the timeouts of a plurality of systems at a plurality of levels to improve the monitoring capability by hierarchizing the software of the watchdog timer.

A second object of the present invention is to speed up the timeout sensing by hierarchizing the software of the watchdog timer to set a suitable timeout value in the watchdog timer.

The present invention in a first aspect is a timeout monitoring system comprising plural timeout value setting means and plural timeout monitoring means and capable of outputting an abnormality notice from the timeout monitoring means at the last stage by connecting each of the plural timeout value setting means and each of the plural timeout monitoring means alternately, in which each of the plural timeout value setting means sets a timeout value as a result of the start-up; the timeout monitoring means except for the one at the last stage does not start the timeout value setting means at the following stage but stops it, when the timeout value set by the timeout value setting means at the preceding stage is not set again even after a specific time has elapsed; and the timeout monitoring means at the last stage outputs an abnormality notice, when the timeout value set by the timeout value setting means at the preceding stage is not set again even after the specific time has elapsed.

The present invention in a second aspect is a timeout monitoring system which comprises plural timeout value setting means, plural timeout monitoring means, and a watchdog timer and is capable of outputting an abnormality notice from the watchdog timer by connecting each of the plural timeout value setting means and each of the plural timeout monitoring means alternately and further connecting the watchdog timer to the timeout value setting means at the last stage, in which each of the timeout value setting means sets a timeout value as a result of the start-up; each of the timeout monitoring means does not start the timeout value setting means at the following stage but stops it, when the timeout value set by the timeout value setting means at the preceding stage is not set again even after a specific time has elapsed; and the watchdog timer outputs an abnormality notice, when the timeout value set by the timeout value setting means at the last stage is not set again even after a specific time has elapsed.

The invention in a third aspect is a timeout monitoring system according to the first or second aspect, wherein each of the plural timeout monitoring means executes the process of outputting an abnormality notice instead of stopping the timeout value setting means at the following stage.

The invention in a fourth aspect is a timeout monitoring system according to the first or second aspect, wherein each of the plural timeout value setting means is started by start-up control and has plural condition variable setting means for setting condition variables independently at regular intervals of time, and each of the plural timeout monitoring means includes plural condition execution means that have the judging conditions corresponding to the condition variables set by the condition variable setting means at the preceding stage and that change the condition variables according to a specific rule and execute the process of outputting an abnormality notice on the basis of the changed condition variables and the judging conditions.

The invention in a fifth aspect is a timeout monitoring system according to the second aspect, wherein the timeout monitoring means at the last stage sets a first timeout value periodically in the timeout value setting means at the last stage, and the timeout value setting means at the last stage sets a second timeout value in the watchdog timer, when the timeout monitoring means at the last stage has set the first timeout value.

The invention in a sixth aspect is a timeout monitoring system according to the fourth aspect, wherein each of the plural condition variable setting means sets plural condition variables, and each of the plural condition execution means has the judging conditions corresponding to the condition variables in a one-to-one relation set by the condition variables setting means in the preceding stage, and not only changes each of the condition variables independently according to a specific rule, but also executes the process of outputting an abnormality notice or the start-up control of the condition variable setting means at the following stage independently, on the basis of each of the changed condition variables and the corresponding judging condition.

The invention in a seventh aspect is a timeout monitoring system according to the sixth aspect, wherein each of the plural condition execution means has a condition judgment setting table in which the condition variables, more than one judging condition corresponding to the condition variables in a one-to-one relation, and the handling processes corresponding to the judging conditions in a one-to-one relation are set.

The invention in an eighth aspect is a timeout monitoring system according to the fourth aspect, wherein each of the plural condition execution means stop the timeout value setting means at the last stage instead of the process of outputting an abnormality notice.

The invention in a ninth aspect is a timeout monitoring system according to the fourth aspect, wherein the timeout value setting means at the last stage, when having the timeout value set therein, judges on the basis of the contents of the setting whether or not any abnormality is present in the watchdog timer and, when the result of the judgment has shown that an abnormality is present, sets an error in the condition variable of a specific condition execution means.

The invention in a tenth aspect is a timeout monitoring system according to the sixth aspect, wherein any one of the condition variables is set so as to correspond to a type of an abnormality in the hardware, and the condition execution means having the condition variable stops the timeout value setting means at the last stage on the basis of the condition variable and the judging condition corresponding to the condition variable, when it has been judged that an abnormality is present.

The invention in an eleventh aspect is a timeout monitoring system according to the seventh aspect, wherein any one of the handling processes is the process of sending a stop request to the timeout value setting means at the last stage, the timeout value setting means at the last stage, when receiving a stop request from any one of the condition execution means, sets the error code corresponding to the cause of the generation of the stop request in the watchdog timer, which is then stopped, and the watchdog timer outputs an abnormality notice corresponding to the error code, when the timeout value set by the timeout value setting means at the last stage is not set again even after a specific time has elapsed.

Therefore, with the configuration of the invention of the first aspect, each of the timeout value setting means sets a timeout value as a result of the start-up. Each of the timeout monitoring means except for the one at the last stage does not start the timeout value setting means at the following stage, but stops it, when the timeout value set by the timeout value setting means at the preceding stage is not set again even after a specific time has elapsed. The timeout monitoring means at the last stage outputs an abnormality notice when the timeout value set by the timeout value setting means at the preceding stage is not set again even after a specific time has elapsed. Therefore, it is possible to provide a timeout monitoring system that enables the timeouts of a plurality of systems to be monitored at a plurality of levels by hierarchizing software of the watchdog timer. This improves the monitoring capability.

With the present invention of the second aspect, each of the timeout value setting means sets a timeout value as a result of the start-up. Each of the timeout monitoring means does not start the timeout value setting means at the following stage, but stops it, when the timeout value set by the timeout value setting means at the preceding stage is not set again even after a specific time has elapsed. The watchdog timer outputs an abnormality notice when the timeout value set by the timeout value setting means at the last stage is not set again even after a specific time has elapsed. Therefore, it is possible to provide a timeout monitoring system where hierarchizing the software of the watchdog timer enables not only the sensing of timeout to be speeded up by setting a suitable timeout value in the watchdog timer but also the timeouts of a plurality of systems to be monitored at a plurality of levels. This improves the monitoring capability.

With the present invention of the third aspect, each of the timeout monitoring means executes the process of outputting an abnormality notice instead of the process of stopping the timeout value setting means at the following stage. Therefore, in addition to the effects in the first and second aspects, it is possible to provide a timeout monitoring system that enables not only the timeout sensing to be speeded up but also the error process in each layer to be used, because the timeout monitoring means that has sensed the timeout outputs an abnormality notice directly.

With the present invention of the fourth aspect, a plurality of condition variable setting means in each timeout value setting means are started on the basis of start-up control and set condition variables independently at regular intervals of time. A plurality of condition execution means in each timeout monitoring means have the judging conditions corresponding to the condition variables set by the condition variable setting means at the preceding stage and change the condition variable according to a specific rule. On the basis of the changed condition variable and the judging condition, the condition execution means execute the process of outputting an abnormality notice. Therefore, in addition to the effects in the first and second aspects, it is possible to provide a timeout monitoring system capable of monitoring an abnormality in an execution level different from the present execution level besides timeout by causing the condition variables or judging conditions to correspond to given abnormality sensing items.

With the present invention of the fifth aspects, the one at the last stage of the timeout monitoring means sets a first timeout value in the timeout value setting means at the last stage periodically. The timeout value setting means at the last stage sets a second timeout value in the watchdog timer when the timeout monitoring means at the last stage has set the first timeout value. Therefore, in addition to the effect in the second aspect, it is possible to provide a timeout monitoring system capable of sensing an abnormality in the timeout monitoring means at the last stage even if an abnormality has occurred in the timeout monitoring means at the last stage, because the stop of the timeout value setting means at the last stage at the following stage causes the watchdog timer to output an abnormality notice.

With the present invention of the sixth aspect, each of the condition variable setting means sets a plurality of condition variables. Each of the condition execution means has the judging conditions corresponding to the condition variables set by the condition variable setting means at the preceding stage and changes each condition variable independently according to a specific rule. On the basis of each changed condition variable and the judging condition corresponding to the changed condition variable, the condition execution means executes the process of outputting an abnormality notice or control the start of the condition variable setting means at the following stage. Therefore, in addition to the effect in the fourth aspect, it is possible to provide a timeout monitoring system capable of monitoring a plurality of timeouts at each execution level because the condition variable setting means sets a plurality of condition variables.

With the present invention of the seventh aspect, each of the condition execution means has a condition judgment setting table in which the condition variables, more than one judging condition corresponding to the condition variables in a one-to-one relation, the handling processes corresponding to the judging conditions in a one-to-one relation are set. Therefore, in addition to the effect in the sixth aspect, it is possible to provide a timeout monitoring system capable of not only executing a given handling process for each abnormality but also executing a close handling process according to each state, such as a minor abnormality or a serious abnormality, by having a plurality of judging conditions.

With the present invention of the eighth aspect, each of the condition execution means in the fourth aspect stops the timeout value setting means at the last stage instead of the process of outputting an abnormality notice. Therefore, in addition to the effect in the fourth aspect, it is possible to provide a timeout monitoring system capable of causing the single watchdog timer to notify timeouts at a plurality of execution levels.

With the present invention of the ninth aspect, when a timeout value has been set, the timeout value setting means at the last stage in the fourth aspect judges on the basis of the contents of the setting whether or not any abnormality is present in the watchdog timer. When the result of the judgment has shown that an abnormality is present, an error is set in the condition variable of a specific condition execution means. Therefore, in addition to the effect in the fourth aspect, it is possible to sense an abnormality in the watchdog timer.

With the present invention of the tenth aspect, any one of the condition variables in the sixth aspect is set so as to correspond to an abnormality in the hardware. When judging on the basis of the condition variable and the judging condition corresponding to the condition variable that an abnormality is present, the condition execution means having the condition variable stops the timeout value setting means at the last stage. Therefore, in addition to the effect in the sixth aspect, it is possible to provide a timeout monitoring system capable of sensing an abnormality in the hardware.

With the present invention of the eleventh aspect, any one of the handling processes in the seventh aspect is the process of sending a stop request to the timeout value setting means at the last stage. When receiving a stop request from any one of the condition execution means, the timeout value setting means at the last stage sets an error code corresponding to the cause of the generation of the stop request in the watchdog timer. When the timeout value set by the timeout value setting means at the last stage is not set again even after a specified time has elapsed, the watchdog timer outputs the abnormality notice corresponding to the error code. Therefore, in addition to the effect in the seventh aspect, it is possible to provide a timeout monitoring system that enables the abnormality notice receiving side to judge the contents of the abnormality, leading to a more quick handling process.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Hereinafter, referring to the accompanying drawings, embodiments of the present invention will be explained.

First Embodiment

Figure 1:
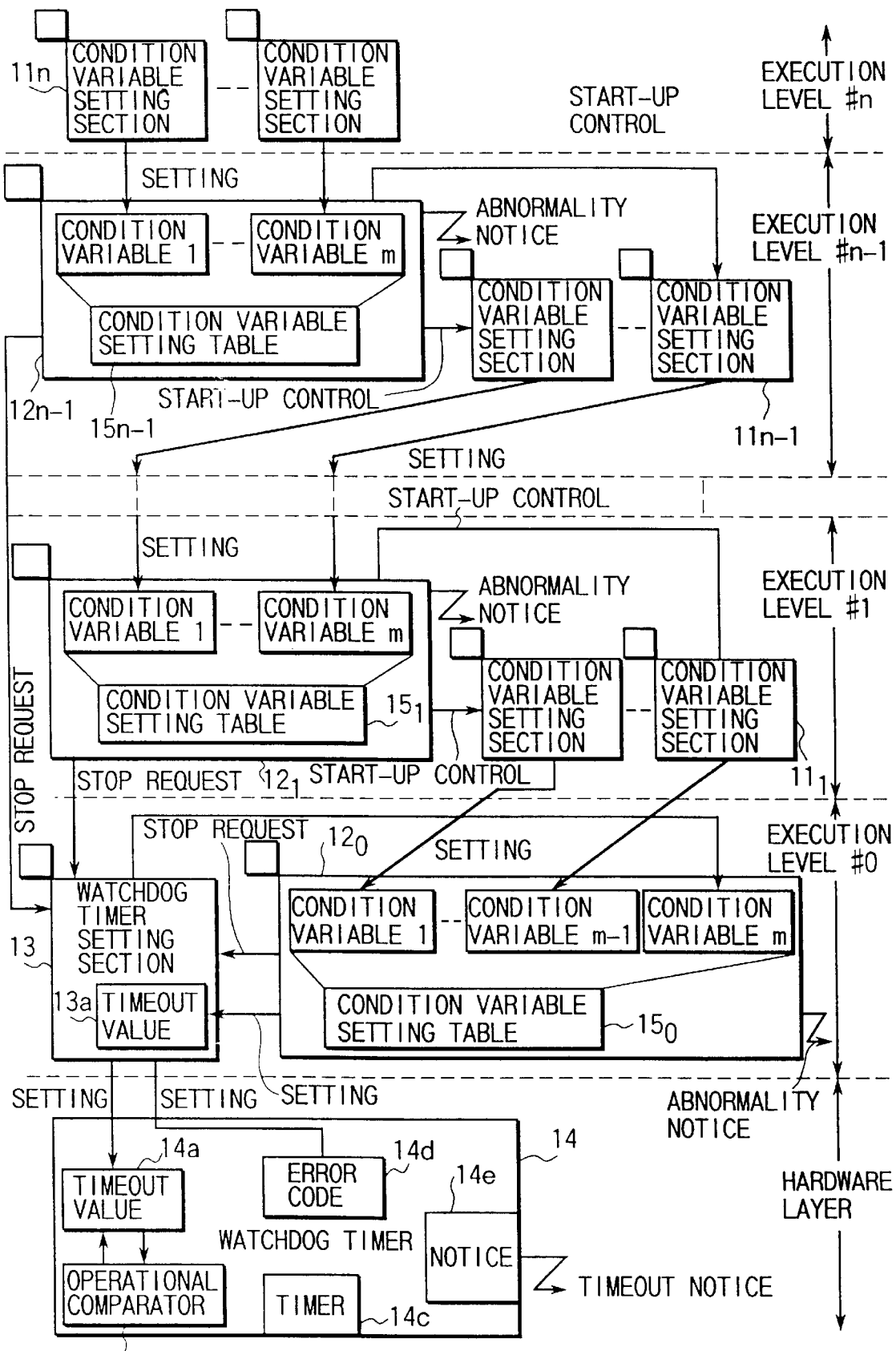
FIG. 1 is a block diagram of the configuration of a timeout sensing mechanism used in a timeout monitoring system according to a first embodiment of the present invention.

FIG. 1 is a block diagram of the configuration of a timeout sensing mechanism applied to a timeout monitoring system according to a first embodiment of the present invention. The timeout sensing mechanism comprises a plurality of condition variable setting sections $11_n$ to $11_1$, a plurality of condition execution sections $12_{n-1}$ to $12_0$, a watchdog timer setting section 13, and a watchdog timer 14. The timeout sensing mechanism has execution level #n, . . . , execution level #1, execution level #0, which are made up of the software hierarchized into (n+1) layers, and an operation level made up of a hardware layer lower in level than execution level #0. The subscripts n to 0 in the condition variable setting sections $11_n$ to $11_1$ and condition execution sections $12_{n-1}$ to $12_0$ represent the execution level to which the respective sections belong. For the execution levels #n to #0, a larger number indicates a more multifunctional lower-speed level closer to the user layer and a smaller number indicates a less multifunctional high-speed level closer to the hardware layer.

Execution level #n is the highest level and has a plurality of condition variable setting sections $11_n$. The individual condition variable setting sections $11_n$ are started by the timer in a lower-level layer (not shown) at regular intervals of time and each has the function of setting the corresponding condition variable in the condition variable setting table $15_{n-1}$ of the condition execution section $12_{n-1}$ in a lower-level layer.

Each of execution level #n−1 to execution level #1 has condition execution sections $12_{n-1}$ to $12_1$ each having condition variable setting tables $15_{n-1}$ to $15_1$ and a plurality of condition variable setting sections $11_{n-1}$ to $11_1$. The number (m−1) of condition variable setting sections $11_1$ at execution level #1 is one less than the number (m) of condition variable setting sections $11_{n-1}$ to $11_2$ at each of execution levels #n to #2 (one of the condition variable setting sections $11_1$ at execution level #1 is omitted, because one of the condition variables of execution level #0 is set from the watchdog timer setting section 13 as explained. later).

In the condition variable setting tables $15_{n-1}$ to $15_0$, an m number of condition variables, more than one judging condition corresponding to the condition variables in a one-to-one relation, and the handling processes corresponding to the judging conditions in a one-to-one relation are set.

The condition variables are set for hardware or software abnormality sensing items, including OS abnormality, abnormality in application programs, and abnormality in the peripheral equipment. For example, (1) a certain value or a counted-down value or (2) 0 (normal value) or an abnormal value is set. The condition variables are not restricted to numerical values and may be codes indicating characters.

The judging condition is, for example, whether or not the value is equal to or larger than a first reference value or whether or not the value is equal to or smaller than a second reference value in the case of item (1). In the case of item (2), the judging condition is whether or not the value is 0. More specifically, item (1) corresponds to the timeout sensing involving countdown and item (2) corresponds to abnormality sensing involving the judgment whether the value is either one or the other value. In this specification, the term "timeout sensing" and the term "abnormality sensing" are used in almost the same meaning. For example, "abnormality sensing" contains "timeout sensing." In the condition execution section, "judgment of the presence or absence of abnormality" contains "judgment of the presence or absence of timeout." Similarly, "abnormality notice" contains "timeout notice."

Regarding the handling processes, for example, in the case of item (1), when the value is equal to or larger than the first reference value, it is normal. When the value is smaller than the first reference value and is equal to or larger than the second reference value, the handling process for errors is executed. When the value is smaller than the second reference value, the handling process for warning is executed (provided that the condition variable at the beginning of setting>the first reference value>the second reference value>0). In the case of item (2), when the value is 0, it is normal. When the value is abnormal, the handling process for abnormality is executed. The handling processes include the process of controlling the startup of the condition variable setting sections $11_{n-1}$ to $11_1$ of the same layer during a normal operation and the process of outputting an abnormal notice or the process of requesting the watchdog timer setting section 13 to stop during an abnormal operation. Moreover, other handling processes, such as the stop/restart of the subsystem, the warning to the user, or the acquisition of logs, may be set as the need arises.

The condition execution sections $12_{n-1}$ to $12_1$ each has the judging conditions corresponding in a one-to-one relation to the condition variables set by the condition variable setting sections $11_n$ to $11_2$ in the higher-level layers in the condition variable setting tables $15_{n-1}$ to $15_1$. The condition execution sections each has the function of changing the individual condition variables independently according to a specific rule and of executing the handling processes independently on the basis of the changed individual condition variables and the corresponding judging conditions. The specific rule is, for example, the subtraction of a specific value corresponding to countdown in the case of item (1). In the case of item (2), the specific rule is the update of the same contents (0) during a normal operation and the setting of an abnormal value during an abnormal operation.

The condition variable setting sections $11_{n-1}$ to $11_1$ at execution level #n−1 to execution level #1 are started at regular intervals of time by the condition execution sections $12_{n-1}$ to $12_1$, when each of the condition execution sections $12_{n-1}$ to $12_1$ at the preceding stage has judged that each condition variable is not abnormal. The condition variable setting sections each has the function of setting a condition variable in each of the condition execution sections $12_{n-2}$ to $12_0$ at the following stage.

Execution level #0 has a condition execution section $12_0$ and a watchdog timer setting section 13. In addition to the function of each of the condition execution sections $12_{n-1}$ to $12_1$ at execution levels #n−1 to #1 in the higher-level layer, the condition execution section $12_0$ at the execution level #0 has the function of setting a timeout value in the watchdog timer setting section 13 at regular intervals of time and the function of outputting an abnormality notice indicating abnormalities in the watchdog timer 14, when the one set by the watchdog timer setting section 13 of the condition variables presents an abnormal value.

The watchdog timer setting section 13 has a setting register 13a. The watchdog timer setting section 13 has the function of setting a specific timeout value equal to or smaller than the timeout value when the condition execution section $12_0$ at execution level #0 has set a timeout value in the setting register 13a. The watchdog timer setting section 13 also has the function of judging on the basis of the contents of the setting whether or not an abnormality is present in the watchdog timer 14 and of, when the result of the judgment has shown the presence of an abnormality, setting an abnormal value (or error) in the corresponding condition variable of the condition execution section $12_0$ in the same layer at the preceding stage. The watchdog timer setting section 13 also has the function of, when receiving a stop request from any one of the condition execution sections $12_{n-1}$ to $12_0$, setting the error code corresponding to the cause of the generation of the stop request in the watchdog timer 14 and then coming to a stop.

The hardware layer has the watchdog timer 14 composed of a setting register 14a, an operational comparator 14b, a timer 14c, an error code section 14d, and a timeout notifying section 14e.

The watchdog timer 14 has the function of, when a timeout value has been set in the setting register 14a, comparing the value in the setting register 14a with a reference value at the operational comparator 14b, while counting down the value in the setting register. The watchdog timer 14 also has the function of, when the result of the comparison has shown that the timeout value has not set again within a specific period of time, causing the timeout notifying section 14e to output a timeout notice on the basis of the contents of the error code set in the error code section 14d.

Next, the operation of the timeout sensing mechanism thus constructed will be explained.

In FIG. 1, the condition variable setting sections $11_n$ to $11_1$, condition execution sections $12_{n-1}$ to $12_0$, and watchdog timer setting section 13 are executed with the accuracy corresponding to each execution level within a specific period of time by use of the timer mechanism (a process schedule, an OS internal timer interrupt, and a periodic interrupt from an external device). The setting of an execution waiting time need not necessarily be the same in the same level.

When each condition variable setting section $11_n$ in the highest execution level #n is started, it resets the condition variables in the condition variable setting table $15_{n-1}$ of the condition execution section $12_{n-1}$ at a lower-level layer.

When the condition execution section $12_{n-1}$ is started, it changes the individual condition variables in the condition variable setting table $15_{n-1}$ according to a specific rule independently and thereafter compares them with the judging condition in the condition variable setting table $15_{n-1}$ to judge whether or not an abnormality is present. When an abnormality is present, the condition execution section executes a handling process, such as the output of an abnormality notice set in the condition variable setting table $15_{n-1}$, according to the judgment condition.

The handling process includes, for example, three modes: the mode of outputting an abnormality notice directly, the mode of not starting the condition variable setting section $11_{n-1}$ at the following stage, and the mode of giving a stop request to the watchdog timer setting section 13, each of which is set in the condition setting table $15_{n-1}$ arbitrarily.

The mode of outputting an abnormality notice directly has the advantage of being able to use the abnormality process previously prepared at the execution level and output an abnormality notice quickly. The mode of not starting the condition variable setting section $11_{n-1}$ at the following stage has the advantage of being able to output an abnormality notice from the condition execution section $12_0$ at the last stage as a result of an abnormality in the condition variable transmitting from the high-level layer to the low-level layer one after another and concentrate the abnormality notice output section in the software section. This mode also has the advantage that even if a certain condition execution section $12_0$ itself has caused an abnormality, a similar transmitting mechanism, that is, a mechanism provided with the condition variable setting sections $11_n$ to $11_1$ and condition execution sections $12_{n-1}$ to $12_0$ arranged alternately, will be able to output an abnormality notice from the condition execution section $12_0$ at the last stage as a result of the abnormality propagating to the low-level layer.

The mode of giving a stop request to the watchdog timer setting section 13 has the advantage that the single watchdog timer 14 can output different abnormality notices of execution levels #n to #0 by making the stop of the watchdog timer setting section 13 cause the watchdog timer 14 to output a timeout notice.

The operation of each of the modes of the handling process will be explained. Of the three modes, the one of each of the condition execution sections $12_{n-1}$ to $12_0$ outputting an abnormality directly is as has been explained earlier, so an explanation of the mode will be omitted.

(Handling process of not starting the condition variable setting section at the following stage)

When the judgment based on the condition variable setting table $15_{n-1}$ has shown that there is no abnormality, the condition execution section $12_{n-1}$ starts the condition variable setting section $11_{n-1}$ at the following stage. Similarly, when there is no abnormality, the condition variable setting sections $11_{n-2}$ to $11_1$ are started by the condition execution sections $12_{n-2}$ to $12_1$ at the preceding stage one after another from the high-level layer to the low-level layer. At the same time, each of the condition execution sections $12_{n-2}$ to $12_1$ in the lower layer than that of the started condition variable setting sections $11_{n-1}$ to $11_1$ judges in sequence whether or not any abnormality is present. This enables a judgment whether or not any abnormality is present to be made for all of the condition variables. When an abnormality is present, the condition variable setting sections $11_{n-1}$ to $11_1$ are not started from the high-level layer to the low-level layer and the condition variables in the condition execution sections $12_{n-2}$ to $12_1$ indicate timeout in sequence, so the result of the judgment an abnormality is present is transmitted sequentially to the low-level layer.

This makes it possible to output an abnormality notice reliably even when the condition execution section at any execution level #i has sensed an abnormality.

(Handling process of giving a stop request to the watchdog timer setting section)

When the judgment whether or not any abnormality is present by use of the condition variable setting tables $15_{n-1}$ to $15_0$ has shown that an abnormality is present, the condition execution section $12_{n-1}$ to $12_0$ each sends a stop request to the watchdog timer setting section 13 on the basis of the handling process.

When receiving the stop request, the watchdog timer setting section 13 sets an error code corresponding to the cause of the generation of the stop request in the watchdog timer 14 and comes to a halt. Namely, the watchdog setting section 13 cannot set a timeout value in the watchdog timer 14.

The watchdog timer setting section 13 sets a timeout value in the watchdog timer 14 at regular intervals of time. While counting down the timeout value, the watchdog timer causes the operational comparator 14b to compare the timeout value with a reference value. When the result of the comparison has shown that the timeout value has not been set again within a specific period of time, the timeout notifying section 14e outputs a timeout notice on the basis of the contents of the error code set in the error code section 14d.

When the timeout notice based on the contents of the error code is outputted as described above, the timeout notice receiving side can judge the contents of the abnormality, leading to a more rapid handling process.

The operation of sensing an abnormality except for the handling operation at the condition variable setting tables $15_{n-1}$ to $15_0$ will be explained.

(When the watchdog timer is abnormal)

The condition execution section $12_0$ at execution level #0 sets a timeout value in the watchdog timer setting section 13 at regular intervals of time. When having the timeout value set therein, the watchdog timer setting section 13 sets a specific timeout value other than and smaller than the above timeout value in the watchdog timer 14. Thereafter, for example, the watchdog timer setting section 13 reads the timeout value and judges on the basis of the presence or absence of a response whether any abnormality is present in the watchdog timer 14. When the result of the judgment has shown the absence of an abnormality, the watchdog timer setting section 13 waits as it is. When the result of the judgment has shown the presence of an abnormality, the watchdog timer setting section 13 sets an abnormal value in the condition variable corresponding to the condition execution section $12_0$ at the preceding stage.

This enables the condition execution section $12_0$ at execution level #0 to output an abnormality notice of the watchdog timer 14, so even if an abnormality occurs in the watchdog timer 14 itself and this prevents the watchdog timer 14 from outputting a timeout notice, the watchdog timer setting section 13 can output an abnormality notice reliably via the condition execution section $12_0$.

(When the condition execution section at the last stage is abnormal)

The condition execution section $12_0$ at execution level #0 sets a timeout value in the watchdog timer setting section 13 at regular intervals of time. When having the timeout value set therein, the watchdog timer setting section 13 sets a timeout value in the watchdog timer 14.

Therefore, even if an abnormality occurs in the condition execution section $12_0$ at execution level #0 and this prevents the condition execution section $12_0$ from outputting an abnormality notice, a timeout notice can be outputted because the abnormality prevents the condition execution section $12_0$ from setting a value in the watchdog timer setting section 13 and therefore the watchdog timer setting section 13 cannot set a timeout value in the watchdog timer 14, permitting the watchdog timer to take time out.

Since the overhead of the watchdog timer setting section 13 can be made very small, the watchdog timer setting section 13 can be restarted in a very short period. A very serious abnormality, such as the stop of the computer system's hardware or a hang-up in the lowest-level layer, can be sensed at high speeds by setting the timeout value (or the time) in the watchdog timer at a small value.

As described above, with the first embodiment, it is possible to monitor the timeouts of a plurality of systems at a plurality of levels and improve the monitoring capability by providing the hierarchized software composed of the condition variable setting sections $11_n$ to $11_1$ and condition execution sections $12_{n-1}$ to $12_0$ and sensing a timeout or an abnormality at each of the condition execution sections $12_{n-1}$ to $12_0$ corresponding to the plurality of systems at the plurality of levels.

Specifically, the condition variable setting sections $11_n$ to $11_1$ executed at the execution levels #n to #1 can be set according to the importance of an abnormality to be sensed and the overhead of each of the condition variable setting sections $11_n$ to $11_1$. In the case of abnormality, the highly functional handling process can be executed in the range of level #n−1 to #0 at which the condition execution sections $12_{n-1}$ to $12_0$ are executed.

Since the timeout sensing at a suitable execution level and the handling process for the timeout can be executed, services at the execution levels #n−1 to #0 can be used, facilitating the development of software.

Furthermore, with the first embodiment, the hierarchized software of the watchdog timer 14 enables a suitable timeout value to be set in the watchdog timer 14 for a higher-speed sensing of a timeout and to monitor the timeouts of a plurality of systems at a plurality of levels. This improves the monitoring capability.

With the first embodiment, depending on the contents of the condition variable setting tables $15_{n-1}$ to $15_0$, the one of the condition execution section $12_{n-1}$ to $12_0$ that has sensed a timeout or an abnormality outputs an abnormal notice directly. This helps speed up the sensing of timeout.

With the first embodiment, by causing the condition variables and judging conditions to correspond to given abnormality sensing items, an abnormality in an execution level different from the present execution level can be monitored in addition to timeout.

With the first embodiment, the condition execution section $12_0$ at the last stage sets a timeout value in the watchdog timer setting section 13 at regular intervals of time. When having the timeout value set therein, the watchdog timer setting section 13 sets a timeout value in the watchdog timer 14. Therefore, even if an abnormality has occurred in the condition execution section $12_0$ at the last stage, an abnormality in the condition execution section $12_0$ at the last stage can be sensed because the stop of the watchdog timer setting section 13 causes the watchdog timer 14 to output a timeout notice.

Furthermore, with the first embodiment, since the condition variable setting sections $11_n$ to $11_1$ set the condition variables independently at a plurality of levels #n to #1, it is possible to monitor a plurality of timeouts at each of the execution levels #n to #0.

With the first embodiment, because the condition execution sections $12_{n-1}$ to $12_0$ are provided with the condition variable setting tables $15_{n-1}$ to $15_0$, any handling process can be executed for each abnormality. Use of a plurality of judging conditions enables close handling processes to be executed according to such a state as a minor abnormality or a serious abnormality.

With the first embodiment, depending on the contents of the condition variable setting tables $15_{n-1}$ to $15_0$, the condition execution sections $12_{n-1}$ to $12_0$ that have sensed a timeout or an abnormality send a stop request to stop the watchdog timer setting section 13. This enables the single watchdog timer 14 to notify a timeout or an abnormality at a plurality of execution levels #n to #0.

With the first embodiment, when the watchdog timer setting section 13 has set a timeout value in the watchdog timer 14, it is judged based on the contents of the setting whether or not any abnormality is present in the watchdog timer 14. When the result of the judgment has shown that an abnormality is present, an error is set in the condition variable of the condition execution section $12_0$ at the preceding stage. This makes it possible to notify an abnormality in the watchdog timer 14 via the condition execution section $12_0$ at the preceding stage. This enables an abnormality in the watchdog timer 14 to be sensed easily and reliably.

With the first embodiment, because any one of the condition variables is set so as to correspond to an abnormality in the hardware, when any one of the condition execution sections $12_{n-1}$ to $12_0$ has judged based on the condition variable that an abnormality is present, a stop request is sent to the watchdog timer setting section 13, which is then stopped. Then, the watchdog timer 14 is caused to output a timeout notice. This makes it possible to sense an abnormality in the hardware, such as the peripheral equipment.

With the first embodiment, any one of the handling processes is the process of sending a stop request to the watchdog timer setting section 13. When receiving a stop request from any one of the condition execution sections $12_{n-1}$ to $12_0$, the watchdog timer setting section 13 sets the error code corresponding to the cause of the generation of the stop request in the watchdog timer 14 and comes to a halt. When the timeout value is not set again even after a specified time has elapsed, the watchdog timer 14 outputs a timeout notice according to the contents of the error code section 14d. This enables the timeout notice receiving side to judge the contents of the abnormality, leading to a quicker handling process.

Second Embodiment

Figures 2, 3:
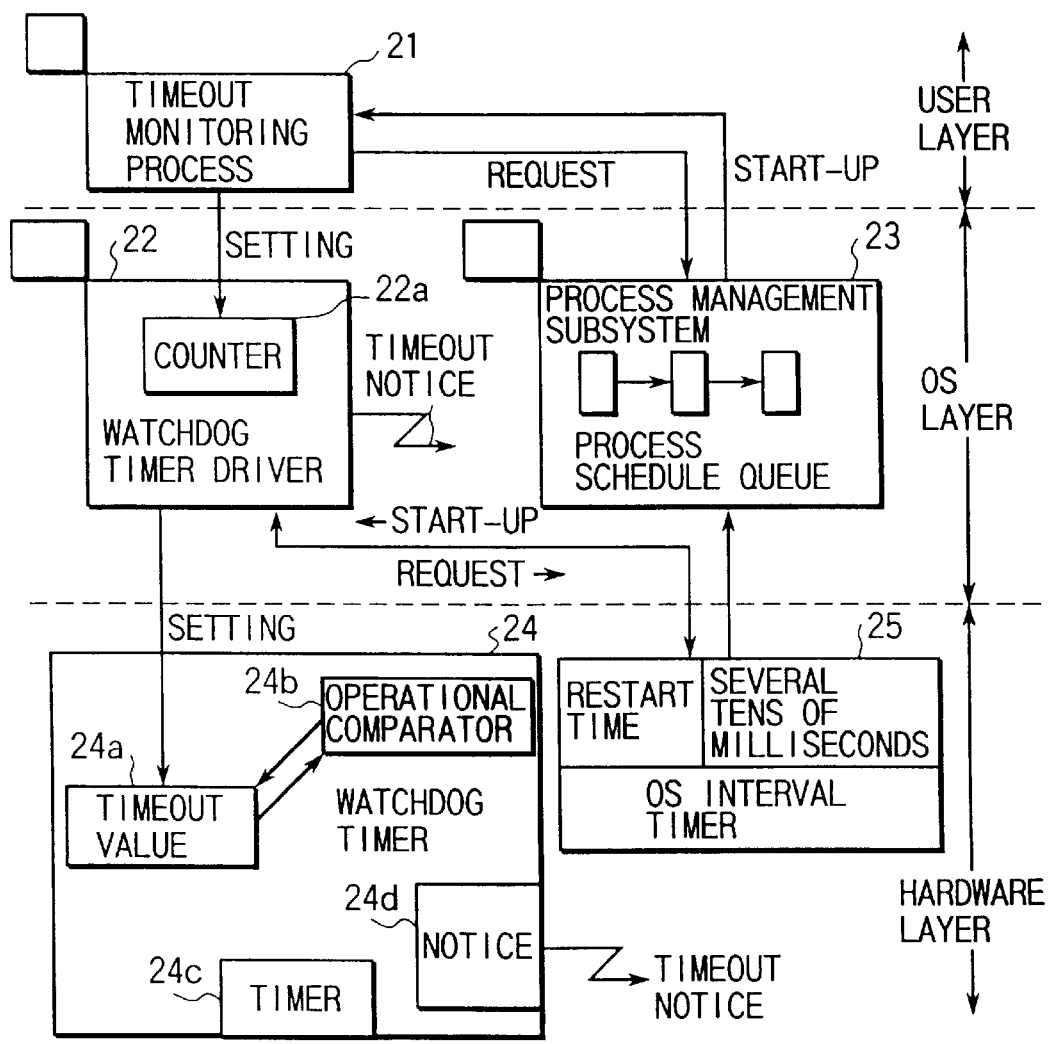
FIG. 2 shows the structure of a condition variable setting table in the first embodiment.
FIG. 3 is a block diagram of the configuration of a timeout sensing mechanism used in a timeout monitoring system according to a second embodiment of the present invention.
Figure 4:
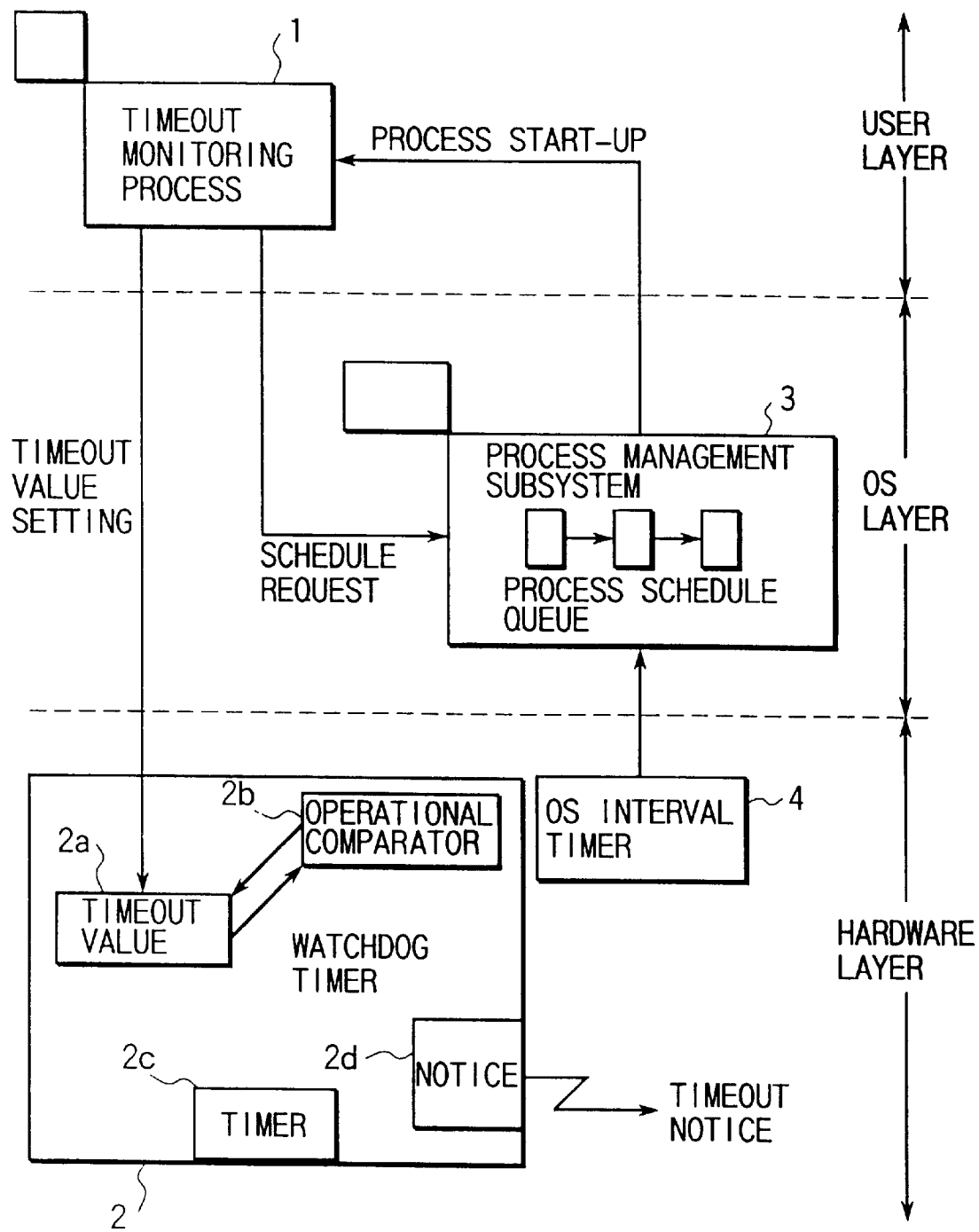
FIG. 4 is a block diagram of the configuration of a watchdog timer mechanism applied to a conventional timeout monitoring system.

Hereinafter, a timeout monitoring system according to a second embodiment of the present invention will be explained. FIG. 3 is a block diagram of the configuration of the timeout monitoring system applied to a timeout sensing mechanism. The timeout sensing mechanism comprises a timeout monitoring process 21 in the user layer, a watchdog timer driver 22 and a process management subsystem 23 in the OS layer, and a watchdog timer 24 and an OS interval timer 25 in the hardware layer. The individual layers can operate at high speeds in this order: the hardware layer, OS layer, and user layer.

When being started by the process management subsystem 23, the timeout monitoring process 21 sets a positive count value in the watchdog timer driver 22 and thereafter requests the process management subsystem 23 to execute the process again after a specific period of time and goes into the holding state.

The watchdog timer driver 22 has a counter 22a in which a count value is set by the timeout monitoring process 21. The watchdog timer driver 22 has the function of, when being started, setting a timeout value in the watchdog timer 24, decrementing the count value in its own counter by one, requesting the OS interval timer 25 to restart after a specific period of time, and going into the holding state. The watchdog timer driver 22 also has the function of outputting a timeout notice, when the count value in its own counter 22a has reduced to zero.

The watchdog timer 24 includes a setting register 24a, an operational comparator 24b, a timer 24c, and a timeout notifying section 24d. In the watchdog timer 24, when the watchdog timer driver 22 sets a timeout value in the setting register 24a, the operational comparator 24b compares the value in the setting register 24a with a reference value, while the timer 24c is counting down the value in the setting register 24a. When the result of the comparison has shown that the timeout value has not been set again within a specific period of time, the timeout notifying section 24d outputs a timeout notice.

The OS interval timer 25 has the function of starting the process management subsystem 23 at intervals of several tens of milliseconds. The OS interval timer also has the function of, when being requested by the watchdog timer 22 to restart it after a specific time, restarting the watchdog timer driver 22 after the specific time has elapsed.

The process management subsystem 23 is started at regular intervals of time by the OS interval timer 25 and manages a plurality of process schedule queues. The process management subsystem has the function of, when being requested by the timeout monitoring process 21 to execute the process again, executing the timeout monitoring system 21 again on the basis of the reexecution request and how busy the process schedule queues are.

Next, the operation of the timeout sensing mechanism constructed as described above will be explained.

The OS interval timer 25 starts the watchdog timer driver 22 and process management subsystem 23. The process management subsystem 23 starts the timeout monitoring process 21.

When being started by the process management subsystem 23, the timeout monitoring process 21 sets the positive count value in the watchdog timer driver 22 and thereafter requests the process management subsystem 23 to execute the process again after a specific time and goes into the holding state.

Being started, the watchdog timer driver 22 sets a timeout value in the watchdog timer 24, decrements the count value of the counter 22a by one and requests the OS interval timer 25 to restart the watchdog timer driver 22 after a specific time and goes into the holding state.

Here, there is the following relationship between the timeout value of the watchdog timer 24 and the restart time of the watchdog timer driver 22: the timeout value of the watchdog timer 24>the restart time of the watchdog timer driver 22.

In the watchdog timer 24, when the watchdog timer driver 22 sets the timeout value in the setting register 24a, the operational comparator 24b compares the value in the setting register 24a with a reference value, while the timer 24c is counting down the value in the setting register. When the result of the comparison has shown that the timeout value has not been set again within a specific period of time, the timeout notifying section outputs a timeout notice.

Since the restart time of the watchdog timer driver 22 can be set much shorter than the timeout value of the user layer, the timeout value in the watchdog timer 24 can also be set at a smaller value, which enables an abnormality, such as the impossibility of the start of the watchdog timer driver 22, to be sensed at high speed.

The watchdog timer driver 22 decrements the count value set by the timeout monitoring process 21 by one. When the count value has reached zero, the watchdog timer driver 22 judges that the timeout monitoring process 21 has taken timeout and outputs a timeout notice.

In the process, the following relationship holds: (the timeout value in the timeout monitoring process 21)=(the restart time for which the watchdog timer driver 22 has requested the OS interval timer 25)×(the count value set by the timeout monitoring process 21).

After setting the count value, the timeout monitoring process 21 requests the process management subsystem 23 to restart the timeout monitoring process at a specified restart time.

When being requested by the timeout monitoring process 21 for restart, the process management subsystem 23 tries to start the timeout monitoring process 21 after the specified restart time has been elapsed. Depending on how busy the process schedule queues are, the actual elapsed restart time may be later than the specified restart time.

To avoid this problem, the timeout monitoring process 21 has to specify the count value and the restart time giving these some allowance, so that (the specified restart time)+(allowance time $\alpha$)=(the actual restart time) may hold. When (the specified restart time)×(the count value) (=the timeout value in the timeout monitoring process) is set at a value equal to the timeout value set in a conventional watchdog timer, this enables the watchdog timer 24 to sense the timeout of the timeout monitoring process in the user layer as in the prior art.

As described above, with the second embodiment, timeout at two execution levels in the user layer and OS layer can be monitored and sensed with the single watchdog timer 24.

Other Embodiments

In the first embodiment, condition variables are set in the condition execution section $12_{n-1}$ in a low-level layer from the condition variable setting section $11_n$ in the high-level layer and the condition execution section $12_{n-1}$ in a certain layer controls the start of the condition variable setting section $11_{n-1}$ in the same layer. The present invention is not limited to this. Even when the condition execution section 12 is of the higher layer, the same layer, or the lower layer than that of the condition variable setting section 11, the present invention can be practiced similarly and produce the same effect.

With the second embodiment, when the timeout of the timeout monitoring process 21 has been sensed, the watchdog timer driver 22 outputs a timeout notice. The present invention is not limited to this. Even with a configuration where the watchdog timer 24 is caused to output a timeout notice by causing the watchdog timer driver 22 to give a timeout notice to the watchdog driver 22 or stop setting a value in the setting register 24a, the present invention can be practiced similarly and produce the same effect.

The method or system described in the above embodiments may be stored in a storage medium, such as a magnetic disk (e.g., a floppy disk or a hard disk), an optical disk (e.g., a CD-ROM or a DVD), or a semiconductor memory, in the form of a program that can be executed by the computer.

For example, the software of the condition variable setting sections $11_n$ to $11_1$ and condition execution sections $12_{n-1}$ to $12_0$ is stored in a storage medium and can be distributed. The software of the watchdog timer setting section 13 may be added to the software in the storage medium.

The present invention may be practiced or embodied in still other ways without departing from the spirit or essential character thereof.

According to the present invention of the first aspect, each of the timeout value setting means sets a timeout value as a result of the start-up. Each of the timeout monitoring means except for the one at the last stage does not start the timeout value setting means at the following stage, but stops it, when the timeout value set by the timeout value setting means at the preceding stage is not set again even after a specific time has elapsed. The timeout monitoring means at the last stage outputs an abnormality notice when the timeout value set by the timeout value setting means at the preceding stage is not set again even after a specific time has elapsed. Therefore, it is possible to provide a timeout monitoring system that enables the timeouts of a plurality of systems to be monitored at a plurality of levels by hierarchizing software of the watchdog timer. This improves the monitoring capability.

According to the present invention of the second aspect, each of the timeout value setting means sets a timeout value as a result of the start-up. Each of the timeout monitoring means does not start the timeout value setting means at the following stage, but stops it, when the timeout value set by the timeout value setting means at the preceding stage is not set again even after a specific time has elapsed. The watchdog timer outputs an abnormality notice when the timeout value set by the timeout value setting means at the last stage is not set again even after a specific time has elapsed. Therefore, it is possible to provide a timeout monitoring system where hierarchizing the software of the watchdog timer enables not only the sensing of timeout to be speeded up by setting a suitable timeout value in the watchdog timer but also the timeouts of a plurality of systems to be monitored at a plurality of levels. This improves the monitoring capability.

According to the present invention of the third aspect, each of the timeout monitoring means executes the process of outputting an abnormality notice instead of the process of stopping the timeout value setting means at the following stage. Therefore, in addition to the effects in the first and second aspects, it is possible to provide a timeout monitoring system that enables not only the timeout sensing to be speeded up but also the error process in each layer to be used, because the timeout monitoring means that has sensed the timeout outputs an abnormality notice directly.

According to the present invention of the fourth aspects, a plurality of condition variable setting means in each timeout value setting means are started on the basis of start-up control and set condition variables independently at regular intervals of time. A plurality of condition execution means in each timeout monitoring means have the judging conditions corresponding to the condition variables set by the condition variable setting means at the preceding stage and change the condition variable according to a specific rule. On the basis of the changed condition variable and the judging condition, the condition execution means execute the process of outputting an abnormality notice. Therefore, in addition to the effects in the first and second aspects, it is possible to provide a timeout monitoring system capable of monitoring an abnormality in an execution level different from the present execution level besides timeout by causing the condition variables or judging conditions to correspond to given abnormality sensing items.

According to the present invention of the fifth aspect, the one at the last stage of the timeout monitoring means sets a first timeout value in the timeout value setting means at the last stage periodically. The timeout value setting means at the last stage sets a second timeout value in the watchdog timer when the timeout monitoring means at the last stage has set the first timeout value. Therefore, in addition to the effect in the second aspect, it is possible to provide a timeout monitoring system capable of sensing an abnormality in the timeout monitoring means at the last stage even if an abnormality has occurred in the timeout monitoring means at the last stage, because the stop of the timeout value setting means at the last stage at the following stage causes the watchdog timer to output an abnormality notice.

According to the present invention recited in the sixth aspect, each of the condition variable setting means sets a plurality of condition variables. Each of the condition execution means has the judging conditions corresponding to the condition variables set by the condition variable setting means at the preceding stage and changes each condition variable independently according to a specific rule. On the basis of each changed condition variable and the judging condition corresponding to the changed condition variable, the condition execution means executes the process of outputting an abnormality notice or control the start of the condition variable setting means at the following stage. Therefore, in addition to the effect in the fourth aspect, it is possible to provide a timeout monitoring system capable of monitoring a plurality of timeouts at each execution level because the condition variable setting means sets a plurality of condition variables.

According to the present invention recited in the seventh aspect, each of the condition execution means has a condition judgment setting table in which the condition variables, more than one judging condition corresponding to the condition variables in a one-to-one relation, the handling processes corresponding to the judging conditions in a one-to-one relation are set. Therefore, in addition to the effect in the sixth aspect, it is possible to provide a timeout monitoring system capable of not only executing a given handling process for each abnormality but also executing a close handling process according to each state, such as a minor abnormality or a serious abnormality, by having a plurality of judging conditions.

According to the present invention of the eight aspect, each of the condition execution means in the fourth aspect stops the timeout value setting means at the last stage instead of the process of outputting an abnormality notice. Therefore, in addition to the effect in claim 4, it is possible to provide a timeout monitoring system capable of causing the single watchdog timer to notify timeouts at a plurality of execution levels.

According to the present invention of the ninth aspect, when a timeout value has been set, the timeout value setting means at the last stage in the fourth aspect judges on the basis of the contents of the setting whether or not any abnormality is present in the watchdog timer. When the result of the judgment has shown that an abnormality is present, an error is set in the condition variable of a specific condition execution means. Therefore, in addition to the effect in claim 4, it is possible to sense an abnormality in the watchdog timer.

According to the present invention of the tenth aspect, any one of the condition variables in the sixth aspect is set so as to correspond to an abnormality in the hardware. When judging on the basis of the condition variable and the judging condition corresponding to the condition variable that an abnormality is present, the condition execution means having the condition variable stops the timeout value setting means at the last stage. Therefore, in addition to the effect in claim 6, it is possible to provide a timeout monitoring system capable of sensing an abnormality in the hardware.

According to the present invention of the eleventh aspect, any one of the handling processes in the seventh aspect is the process of sending a stop request to the timeout value setting means at the last stage. When receiving a stop request from any one of the condition execution means, the timeout value setting means at the last stage sets an error code corresponding to the cause of the generation of the stop request in the watchdog timer. When the timeout value set by the timeout value setting means at the last stage is not set again even after a specified time has elapsed, the watchdog timer outputs the abnormality notice corresponding to the error code. Therefore, in addition to the effect in the seventh aspect, it is possible to provide a timeout monitoring system that enables the abnormality notice receiving side to judge the contents of the abnormality, leading to a more quick handling process.

What is claimed is:

1. A timeout monitoring system comprising plural timeout value setting means and plural timeout monitoring means and capable of outputting an abnormality notice from the timeout monitoring means at the last stage by connecting each of the plural timeout value setting means and each of the plural timeout monitoring means alternately, in which each of said plural timeout value setting means sets a timeout value as a result of the start-up;

said timeout monitoring means except for the one at the last stage does not start the timeout value setting means at the following stage but stops it, when the timeout value set by said timeout value setting means at the preceding stage is not set again even after a specific time has elapsed; and said timeout monitoring means at the last stage outputs an abnormality notice, when the timeout value set by said timeout value setting means at the preceding stage is not set again even after the specific time has elapsed.

2. A timeout monitoring system comprising plural timeout value setting means, plural timeout monitoring means, and a watchdog timer and capable of outputting an abnormality notice from said watchdog timer by connecting each of the plural timeout value setting means and each of the plural timeout monitoring means alternately and further connecting said watchdog timer to the timeout value setting means at the last stage, in which each of said timeout value setting means sets a timeout value as a result of the start-up;

each of said timeout monitoring means does not start the timeout value setting means at the following stage but stops it, when the timeout value set by said timeout value setting means at the preceding stage is not set again even after a specific time has elapsed; and said watchdog timer outputs an abnormality notice, when the timeout value set by the timeout value setting means at the last stage is not set again even after a specific time has elapsed.

3. A timeout monitoring system according to claim 1 or 2, wherein each of said plural timeout monitoring means executes the process of outputting an abnormality notice instead of stopping said timeout value setting means at the following stage.

4. A timeout monitoring system according to claim 1 or 2, wherein each of said plural timeout value setting means is started by start-up control and has plural condition variable setting means for setting condition variables independently at regular intervals of time, and each of said plural timeout monitoring means includes plural condition execution means that have the judging conditions corresponding to the condition variables set by the condition variable setting means at the preceding stage and that change said condition variables according to a specific rule and execute the process of outputting an abnormality notice on the basis of said changed condition variables and said judging conditions.

5. A timeout monitoring system according to claim 4, wherein each of said plural condition variable setting means sets plural condition variables, and each of said plural condition execution means has the judging conditions corresponding to the condition variables in a one-to-one relation set by said condition variables setting means in the preceding stage, and not only changes each of said condition variables independently according to a specific rule, but also executes the process of outputting an abnormality notice or the start-up control of the condition variable setting means at the following stage independently, on the basis of each of said changed condition variables and the corresponding judging condition.

6. A timeout monitoring system according to claim 5, wherein each of said plural condition execution means has a condition judgment setting table in which said condition variables, more than one judging condition corresponding to the condition variables in a one-to-one relation, and the handling processes corresponding to the judging conditions in a one-to-one relation are set.

7. A timeout monitoring system according to claim 6, wherein any one of said handling processes is the process of sending a stop request to the timeout value setting means at the last stage, said timeout value setting means at the last stage, when receiving a stop request from any one of said condition execution means, sets the error code corresponding to the cause of the generation of the stop request in said watchdog timer, which is then stopped, and said watchdog timer outputs an abnormality notice corresponding to said error code, when the timeout value set by the timeout value setting means at the last stage is not set again even after a specific time has elapsed.

8. A timeout monitoring system according to claim 5, wherein any one of said condition variables is set so as to correspond to a type of an abnormality in the hardware, and the condition execution means having the condition variable stops the timeout value setting means at the last stage on the basis of the condition variable and the judging condition corresponding to the condition variable, when it has been judged that an abnormality is present.

9. A timeout monitoring system according to claim 4, wherein each of said plural condition execution means stop the timeout value setting means at the last stage instead of said process of outputting an abnormality notice.

10. A timeout monitoring system according to claim 4, wherein said timeout value setting means at the last stage, when having said timeout value set therein, judges on the basis of the contents of the setting whether or not any abnormality is present in said watchdog timer and, when the result of the judgment has shown that an abnormality is present, sets an error in the condition variable of a specific condition execution means.

11. A timeout monitoring system according to claim 2, wherein said timeout monitoring means at the last stage sets a first timeout value periodically in the timeout value setting means at the last stage, and said timeout value setting means at the last stage sets a second timeout value in said watchdog timer, when said timeout monitoring means at the last stage has set the first timeout value.

* * * * *